Sept. 3, 1935.  R. FENNEMA  2,013,342
LUBRICATED COCK
Filed Nov. 21, 1931   2 Sheets-Sheet 1
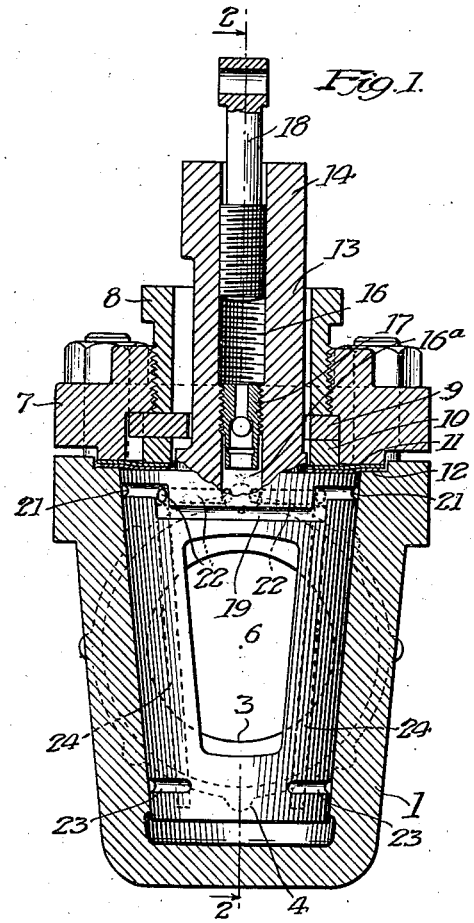
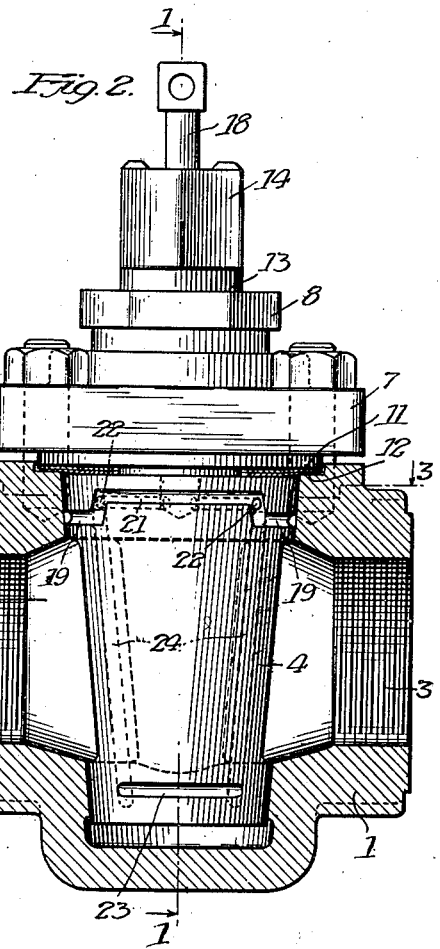
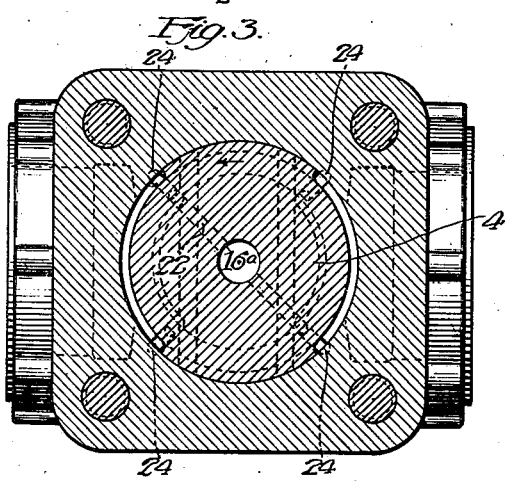
Witness
R. B. Davison
Inventor:
Richard Fennema
By Wilson, Dowell, McCanna & Rehm
Attys Sept. 3, 1935.  R. FENNEMA  2,013,342
LUBRICATED COCK
Filed Nov. 21, 1931   2 Sheets-Sheet 2
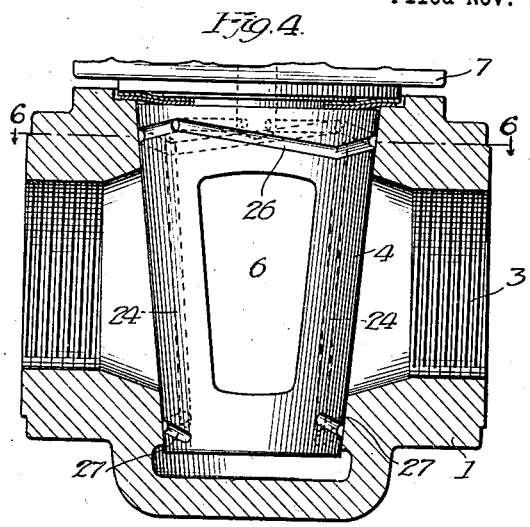
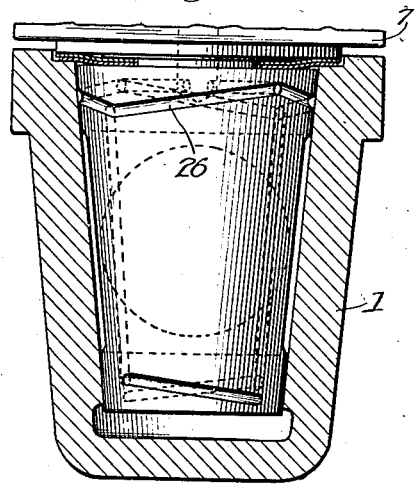
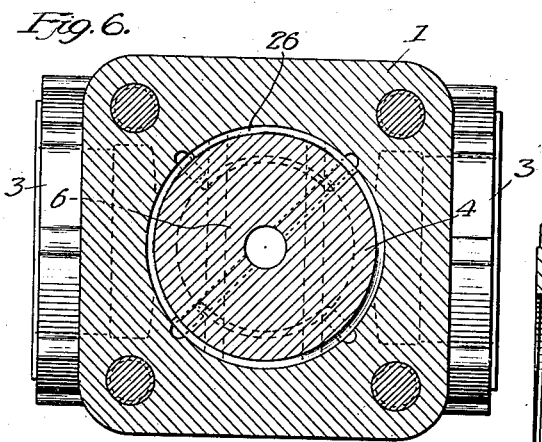
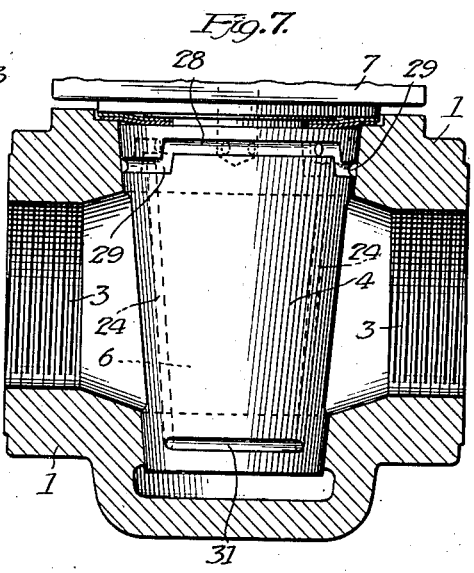
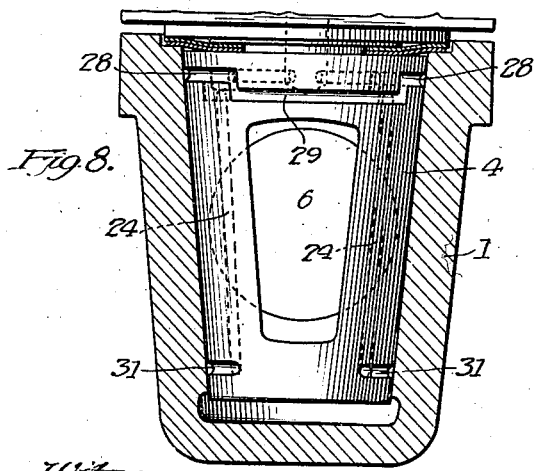
Inventor
Richard Fennema Patented Sept. 3, 1935

2,013,342

UNITED STATES PATENT OFFICE 2,013,342

LUBRICATED COCK

Richard Fennema, Chicago, Ill., assignor to Crane Co., Chicago, Ill., a corporation of Illinois Application November 21, 1931, Serial No. 576,477

4 Claims. (Cl. 251—93)

This invention relates to lubricated plug valves or cocks and has for its purpose the provision of a cock that is thoroughly lubricated, therefore easy to operate and absolutely leak-proof.

In accordance with this invention lubricating channels are provided by means of which the seating surfaces between the plug and body of the cock are adequately lubricated at all times, that is, not only when the cock is in open or closed position, but in all intermediate positions without subjecting the lubricant channels to the line pressure and without permitting lubricant to discharge under pressure into the interior of the cock. Furthermore, the foregoing features are provided in a manner which does not necessitate limiting the rotational movement of the plug of the cock. In those cocks where desired the lubricant may be used to provide a complete seal about the cock port, although such provision is not always necessary.

Other novel features of construction and their resultant advantages will be apparent from the following description of one embodiment of this invention given in connection with the drawings, in which:

Fig. 1 is a vertical transverse section through a plug valve or cock, the plug being in elevation and in open position, constructed in accordance with this invention, Fig. 2 is a side elevation partly in section of the same cock, Fig. 3 is a section on line 3—3 of Fig. 2, but with the plug in closed position, Fig. 4 is a vertical transverse section with the plug in elevation and in closed position of a modified form of lubricating channel, Fig. 5 is a section perpendicular to that of Fig. 4 and of the same form, Fig. 6 is a section on line 6—6 of Fig. 4 through the upper lubricating grooves, Fig. 7 is a vertical section with the plug in elevation and in open position and with still further modified lubricant grooves, and Fig. 8 is a vertical section perpendicular to Fig. 7 and of the same modification, the cock being open.

As can be seen from the drawings, the plug valve or cock comprises a body or casing 1 having a passage 2 therethrough, the ends of which are threaded as at 3 to provide for pipe connections. The body is also formed with the usual tapered cylindrical longitudinal bore transverse to passage 2 to receive a corresponding tapered plug 4, the seating surfaces between the plug and bore being carefully finished to provide seating surfaces. The plug is provided with the transverse port 6 positioned to permit flow through the passage 2 when the port 6 is aligned therewith and to prevent passage through the cock body passage when the plug is rotated 90° from its open position.

The plug is maintained in seating position within the body by means of the usual bonnet 7 and adjusting nut 8 threaded into the bonnet 7. Beneath the lower end of the adjusting nut 8 is a lock washer 9 and a thrust washer 10. A pair of gaskets 11 and 12 may be inserted beneath the thrust washer 10 and the upper annular surface of the plug.

A stem 13 formed integrally upon the plug projects upwardly and passes through the bonnet and adjusting nut and terminates in a square end 14 adapted to receive a wrench by which the plug may be rotated to open or closed position.

To lubricate the valve the stem of the plug is bored to provide a lubricant reservoir 16, the lower end of which is provided with a removable check valve unit 17 and the upper end of which is adapted to receive a compressor in the form of a screw 18, by means of which the lubricant may be compressed in chamber 16 and forced outwardly through check valve 17. In the upper bearing portion of the plug is formed a continuous but offset annular lubricating channel or groove having two diametrically opposite parallel portions 19 substantially 90° in length and parallel to the port through the body and two diametrically opposite parallel portions 21 which overlie the top of the port and are connected by two short longitudinal connecting grooves to portions 19 to form a continuous annular groove around the upper seating surface of the plug. The portions 21 are not in the same horizontal plane as the portions 19, i. e., they lie in two spaced and preferably non-intersecting planes, for reasons which will hereinafter appear. This continuous groove comprising portions 19 and 21 is connected to the lower portion 16a of the reservoir 16 by lateral ducts 22 formed in the plug. The lower portion of the plug is provided with parallel diametrically opposite lubricant grooves 23. These grooves are substantially 90° long and are parallel to port 6 and immediately below portions 19.

The seating surface of the conical bore of the body is provided with four substantially equally spaced vertical or longitudinal lubricant grooves 24 which extend downwardly in the body surface to connect with channels 23 and upwardly a sufficient distance to communicate with channels 19 but not with channels 21.

It follows, therefore, that when plug 4 is in either open or closed position the upper annular groove of the plug is in communication with lower grooves 23 but as the plug is rotated from open to closed position or from closed to open position channels 19 will be disconnected from grooves 24 and will remain disconnected until the plug has been rotated substantially 90°, and the vertical grooves 24 again communicate with the annular groove. The upper portion of the plug, however, is continuously lubricated, since the upper portion is provided with a continuous channel comprising portions 19 and 20. Therefore, although the upper portion of the plug is at all times thoroughly lubricated, the lubricant channels are not subjected to the line pressure as port 6 passes from open to closed position, nor is the lubricant in channels 24 allowed to be forced out of these latter grooves as the port 6 passes thereby.

It is apparent from the foregoing description that a cock constructed in accordance with this invention is thoroughly lubricated at all times without subjecting the lubricant channels to the line pressure and without permitting the lubricant to be forced into the interior of the valve, and that the valve is particularly suitable where the plug is not limited to a 90° rotation and where four-way cocks are desired. Where complete protection and lubrication is desired, the two continuous annular lubricant channels, i. e., one at each end of the plug, may be utilized to provide for a complete lubricant seal in both open and closed positions.

In the form of this invention shown in Figs. 4, 5 and 6, the cock structure is the same as that shown in the previous form, with the exception that the lubricant grooves and channels are modified to some extent. The grooves are so arranged as to facilitate grinding of the plug by preventing annular cuts being made in the body or plug during the grinding in operation. To eliminate the tendency in this respect the upper groove instead of being formed of offset or stepped portions as previously shown is formed of a series of inclined portions which eliminate any horizontal section whatever. The grooves are also arranged so that in closed and open positions diagonally opposite body channels are connected to receive lubricant instead of the opposite channels at the same end of the body being connected to receive lubricant.

As in the previous form the body is provided with four longitudinal or vertical channels 24, one lying adjacent each side of each port through the body. The upper end of the plug is provided with a continuous groove comprising intersecting inclined portions 26 which surround the upper portion of the plug. The inclination and length of these portions is such that at their lower points they contact with the upper ends of channels 24 and at their higher points they clear the upper ends of channels 24. The several portions of the groove are so arranged that when the plug is in closed position, as shown in Figs. 4, 5 and 6, one portion 26 which overlies the passage in the body connects at one end with channel 24 which lies adjacent the back edge of the passage and as it travels around the plug toward the front, as shown in Fig. 4, it rises and clears the upper end of the channel 24 which lies upon the other side of the passage (which channel is cut away in Fig. 4). From the high point overlying this latter longitudinal channel, the groove then descends as it travels around the plug and at the lower end of the next portion 26 engages the next vertical channel 24. From this point the succeeding portion 26 of the groove rises and clears the upper end of channel 24, as shown in Fig. 4, the following portion 26 upon the rear side of the plug then descends and communicates with the upper end of channel 24, as shown.

At the lower end the plug is provided with two arcuate inclined grooves 27. These grooves are substantially parallel with the port 6 through the plug and when the plug is in closed position, they lie beneath the passages through the body. These grooves 27 are inclined downwardly and when in closed position, as shown in Fig. 4, the rearmost end of the groove upon the left of the figure communicates with the lower end of channel 24. The forward end extends downwardly so as to clear the lower end of the channel 24 (which is cut away in the figure). The other groove 27 upon the right side of the plug is similarly inclined so that when in closed position it communicates with the lower end of the channel 24 (which is cut away) and clears the lower end of the adjacent channel 24, as shown. The upper groove composed of portions 26 is supplied with refrigerant through lateral ducts which communicate with the chamber in the stem of the plug as in the previous form of this invention.

In Figs. 7 and 8 a further modification of the upper lubricant groove is shown, in which the same results are accomplished as was specified in connection with the form of this invention shown in Figs. 4, 5 and 6. In the form shown in Figs. 7 and 8, however, the upper grooves instead of being composed of inclined sections are composed of stepped portions in a manner similar to that shown in Figs. 1 to 3, inclusive, but the stepped or offset portions are so arranged as to establish communication with the longitudinal grooves in the manner set forth in the modification shown in Figs. 4, 5 and 6. In other words, the stepped groove at the upper end of the plug does not establish communication with the vertical channels on the same end of the body at each side of the passage therethrough, as shown in Figs. 1 to 3, but establish communication with diagonally opposite channels as described in connection with Figs. 4, 5 and 6.

In this form of the invention the upper lubricant groove is continuous and is composed of offset sections 28 and 29, the former being upon a plane higher than the latter. The sections 28 and 29 are so arranged, relatively to the port 6, that when in closed position the vertical or longitudinal channels 24 are connected in the manner described in connection with the form of this invention shown in Figs. 4 to 6, and are similarly connected when in open position as is shown in Figs. 7 and 8. From these figures it can be seen that when in open position the lower portion 29 is spaced from the longitudinal channel 24 lying to the rear of the passage through the body as shown in Fig. 7, i. e., to the left channel as shown in Fig. 8, but communicates with the channel 24 on the same side of the body lying upon the other side of the channel. The groove then steps upwardly and the portion 28 clears the right channel 24 in Fig. 7 after which it descends and engages the rearmost channel 24, as shown in Fig. 7.

In this form of the invention a pair of diametrically opposite arcuate grooves 31 are employed at the lower end of the plug, the grooves being of sufficient length around the plug to span adjacent longitudinal channels. As shown, these grooves 31 are parallel to the port 6 through the plug although if desired they can be inclined downwardly.

A cock constructed in accordance with this invention may be manufactured very economically in that the grooves may be cast in both the body and the plug. Furthermore, placing the channels 24 in the body facilitates machining of the plug. Where the stepped or offset grooves are employed, as shown in the form illustrated in Figs. 1 to 3, inclusive, provision is made for a continuous lubricant groove in different planes, which feature eliminates the formation of a grinding ring or cut in the body when the plug is ground therein.

When the grooves are formed in the plug as shown in Figs. 4, 5 and 6, a complete seal is not formed around both sides of each end of the passageway through the body, but the lubricant grooves formed on an inclination afford a more even distribution of lubricant and by eliminating all horizontal grooves, positively prevents the formation of a cut caused by the lapping or grinding in of the plug in the body. By forming the grooves as shown in Figs. 7 and 8, the casting problems are somewhat reduced although here again a complete lubricant seal is not formed around one end of the passage. The lubricant, however, is quite effectively wiped over the seating surfaces of the plug and body.

It will be apparent to those skilled in the art that many changes may be made in the details of the constructions shown without departing from the spirit and scope of this invention as defined in the claims appended hereto.

I claim:

1. A plug valve comprising a body having a passage therethrough and a tapered bore transverse to said passage, a correspondingly tapered plug seated in said bore and having a port therethrough arranged to permit flow through said passage in one position and to prevent flow through said passage when rotated about its axis, and means for lubricating the seating surfaces between said plug and body, said means including a lubricant reservoir in said plug, a groove in one of said seating surfaces substantially surrounding said plug, substantially all portions of said groove being inclined, a duct leading from said reservoir to said groove, and spaced longitudinal channels in the other of said seating surfaces having one end of each terminating at portions of said annular groove and stopping short of the other portions thereof.

2. A plug valve comprising a body having a passage therethrough and a tapered bore transverse to said passage, a correspondingly tapered plug seated in said bore and having a port therethrough arranged to permit flow through said passage in one position and to prevent flow through said passage when rotated about its axis, and means for lubricating the seating surfaces between said plug and body, said means including a lubricant reservoir in said plug, a groove in said plug substantially surrounding said plug adjacent one end thereof, substantially all portions of said groove being inclined, a duct leading from said reservoir to said groove, and spaced longitudinal channels in said body, the diagonally opposite longitudinal channels being connected to receive lubricant from said groove when said plug is in closed position and being disconnected from said groove when said plug is rotated from closed position.

3. A plug valve comprising a ported turn plug, a ported body in which the plug is seated, and means for lubricating the seating surfaces of said plug and body comprising a lubricant reservoir, a circumferential lubricant groove in one of said surfaces substantially surrounding the plug between its port and the plug stem and connected with said reservoir, said groove comprising a plurality of connected inclined segments, adjacent segments being inclined in opposite directions, and a plurality of longitudinal lubricant grooves in the other of said surfaces, certain of said longitudinal grooves connecting with said circumferential groove in one position of the plug, and certain other of said longitudinal grooves connecting with said circumferential groove in another position of said plug.

4. A plug valve comprising a ported turn plug, a ported body in which the plug is seated, and means for lubricating the seating surfaces of said plug and body comprising a lubricant reservoir, a circumferential lubricant groove in one of said surfaces substantially surrounding the plug between its port and the plug stem and connected with said reservoir, said groove comprising a plurality of connected inclined segments, adjacent segments being inclined in opposite directions, and a plurality of longitudinal lubricant grooves in the other of said surfaces, certain of said longitudinal grooves connecting with said circumferential groove in one position of the plug, and certain other of said longitudinal grooves connecting with said circumferential groove in another position of said plug, and other segmental inclined grooves in the first mentioned surface arranged to be connected in said different positions of the plug with the same longitudinal grooves which are connected with the said circumferential groove but at the ends thereof opposite from those adjacent said circumferential groove.

RICHARD FENNEMA.